(12) United States Patent
Hung

(10) Patent No.: US 10,571,071 B2
(45) Date of Patent: *Feb. 25, 2020

(54) SECURING BASE FOR SUPPORTING A DISPLAY SUSPENDING APPARATUS THEREON

(71) Applicant: MODERNSOLID INDUSTRIAL CO., LTD., Taichung (TW)

(72) Inventor: Chin-Jui Hung, Taichung (TW)

(73) Assignee: MODERNSOLID INDUSTRIAL CO., LTD., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/269,265

(22) Filed: Feb. 6, 2019

(65) Prior Publication Data

US 2019/0293228 A1  Sep. 26, 2019

(30) Foreign Application Priority Data

Mar. 21, 2018 (TW) .............................. 107203660 U

(51) Int. Cl.
| | |
|---|---|
| *F16M 13/02* | (2006.01) |
| *F16M 11/04* | (2006.01) |
| *A47B 21/03* | (2006.01) |
| *F16B 2/06* | (2006.01) |
| *F16M 11/10* | (2006.01) |
| *F16B 2/12* | (2006.01) |

(52) U.S. Cl.
CPC ....... *F16M 13/022* (2013.01); *A47B 21/0314* (2013.01); *F16B 2/065* (2013.01); *F16M 11/041* (2013.01); *F16M 13/02* (2013.01); *A47B 2200/0085* (2013.01); *F16B 2/12* (2013.01); *F16M 11/10* (2013.01)

(58) Field of Classification Search
CPC ........ A47B 2200/0085; A47B 21/0314; F16M 13/022; F16M 11/041; F16M 13/02; F16B 2/065; F16B 2/20; F16B 2/12; F16B 2/14; B25B 5/10
USPC .... 248/689, 229.16, 229.15, 229.25, 231.41, 248/231.61, 231.71, 917
See application file for complete search history.

(56) References Cited

U.S. PATENT DOCUMENTS

| | | | | |
|---|---|---|---|---|
| 1,372,205 | A | * | 3/1921 | Smith ....................... G09F 1/10 40/658 |
| 1,789,815 | A | * | 1/1931 | Hanley ................. A47B 13/16 248/231.71 |

(Continued)

*Primary Examiner* — Jonathan Liu
*Assistant Examiner* — Taylor L Morris
(74) *Attorney, Agent, or Firm* — Fox Rothschild LLP; Robert J. Sacco; Carol E. Thorstad-Forsyth

(57) ABSTRACT

A securing base includes a base seat unit and a clamp unit. The base seat unit includes a base seat formed with a receiving groove. The clamp unit includes a clamp member and a bolt member. The clamp member has an engaging segment disposed within the receiving groove, a clamp segment disposed outside of the base seat unit, and a connecting segment interconnecting the engaging segment and the clamp segment, and cooperating with the engaging segment and the clamp segment to define a clamp space which gradually shrinks in size away from the connecting segment. The bolt member extends drivingly through the engaging segment. Rotation of the bolt member drives the clamp member to move along the bolt member, thereby moving the clamp segment along an axis.

9 Claims, 10 Drawing Sheets

(56) References Cited

U.S. PATENT DOCUMENTS

| | | | | |
|---|---|---|---|---|
| 2,191,085 A * | 2/1940 | Rosen | B60R 1/06 | 248/475.1 |
| 2,220,214 A * | 11/1940 | Cloutier | F16B 2/065 | 24/461 |
| 2,299,280 A * | 10/1942 | Reed | B60R 1/06 | 248/477 |
| 3,089,211 A * | 5/1963 | Perusse | A47G 21/167 | 24/556 |
| 3,596,862 A * | 8/1971 | Block | A45D 44/14 | 248/121 |
| 4,468,803 A * | 8/1984 | Ronci | F16M 11/08 | 378/167 |
| 4,787,613 A * | 11/1988 | Hayes | B25B 1/22 | 269/72 |
| 4,844,388 A * | 7/1989 | Kuba | A47B 21/0314 | 108/5 |
| 4,895,330 A * | 1/1990 | Anstead | A45B 1/04 | 248/229.12 |
| 5,205,222 A * | 4/1993 | Bernard | D06F 79/02 | 108/42 |
| 5,231,739 A * | 8/1993 | Mattesky | A47G 21/167 | 24/326 |
| 5,282,427 A * | 2/1994 | Steinhilber | A47B 21/03 | 108/152 |
| 5,312,079 A * | 5/1994 | Little, Jr. | F16B 2/065 | 248/214 |
| 5,330,147 A * | 7/1994 | Volcheff | A47B 21/0314 | 248/231.41 |
| 5,667,176 A * | 9/1997 | Zamarripa | B60R 1/12 | 248/231.51 |
| 5,743,499 A * | 4/1998 | Wang | A47B 21/0371 | 248/118 |
| 5,775,654 A * | 7/1998 | Price | A47G 23/0225 | 248/103 |
| 5,833,180 A * | 11/1998 | Baranowski | A47B 21/0371 | 248/118 |
| 5,842,671 A * | 12/1998 | Gibbs | A47G 23/0225 | 248/231.41 |
| 5,938,158 A * | 8/1999 | Tisbo | A47B 17/033 | 248/228.3 |
| 5,938,159 A * | 8/1999 | Hung | A47B 21/0314 | 248/278.1 |
| 5,971,171 A * | 10/1999 | Thorp | A47B 17/033 | 108/92 |
| 5,975,469 A * | 11/1999 | Chen | A47B 21/0371 | 248/118.1 |
| 5,975,472 A * | 11/1999 | Hung | F16M 11/105 | 248/278.1 |
| 6,042,064 A * | 3/2000 | Hong | A47B 21/0371 | 248/118 |
| 6,299,117 B1 * | 10/2001 | Lin | F16M 13/022 | 24/135 R |
| 6,394,403 B1 * | 5/2002 | Hung | F16M 11/10 | 248/276.1 |
| 6,481,680 B2 * | 11/2002 | Neuman | A47G 29/083 | 248/215 |
| 6,619,644 B1 * | 9/2003 | Liou | B25B 1/125 | 269/185 |
| 6,672,553 B1 * | 1/2004 | Lin | F16M 11/08 | 248/276.1 |
| 6,769,657 B1 * | 8/2004 | Huang | F16M 11/10 | 248/278.1 |
| 6,880,791 B1 * | 4/2005 | Lin | F16M 13/02 | 248/231.61 |
| 6,986,489 B2 * | 1/2006 | Oddsen, Jr. | F16M 11/24 | 211/64 |
| 7,066,435 B2 * | 6/2006 | Oddsen, Jr. | F16M 11/10 | 248/220.31 |
| 7,121,516 B1 * | 10/2006 | Koh | A47B 17/033 | 248/226.11 |
| 7,195,215 B2 * | 3/2007 | Lin | F16M 11/2014 | 248/125.9 |
| 7,588,223 B2 * | 9/2009 | Wolvin | F16B 2/06 | 248/229.15 |
| 7,593,219 B2 * | 9/2009 | Quijano | F16M 11/10 | 248/923 |
| 7,823,520 B2 * | 11/2010 | Mayben | A47B 57/00 | 108/129 |
| 8,448,906 B2 * | 5/2013 | Sapper | F16M 11/10 | 248/125.2 |
| 8,756,870 B2 * | 6/2014 | Teller | E04D 13/10 | 52/24 |
| 8,826,831 B2 | 9/2014 | Hazzard et al. | | |
| 9,764,628 B2 * | 9/2017 | Facchinello | B60J 7/198 | |
| 9,873,244 B1 * | 1/2018 | Jurman | B41F 15/36 | |
| 2003/0075653 A1 * | 4/2003 | Li | F16M 11/10 | 248/274.1 |
| 2007/0075198 A1 * | 4/2007 | Foser | E04C 2/428 | 248/226.11 |
| 2008/0265110 A1 * | 10/2008 | Helmonds | A45F 3/44 | 248/156 |
| 2008/0296334 A1 * | 12/2008 | Carnevali | B60R 11/0241 | 224/558 |
| 2010/0327129 A1 * | 12/2010 | Chen | F16M 11/14 | 248/121 |
| 2011/0315840 A1 * | 12/2011 | Connolly | F16M 11/041 | 248/220.31 |
| 2012/0084949 A1 * | 4/2012 | Al-Basri | A47G 21/167 | 24/457 |
| 2012/0119040 A1 * | 5/2012 | Ergun | A47B 21/02 | 248/126 |
| 2013/0062489 A1 * | 3/2013 | DiNello | F16B 2/20 | 248/224.8 |
| 2013/0075564 A1 * | 3/2013 | Ho | F16B 2/12 | 248/316.4 |
| 2013/0075565 A1 * | 3/2013 | Ho | F16B 2/12 | 248/316.4 |
| 2013/0306842 A1 * | 11/2013 | Sakamoto | G03B 21/54 | 250/208.1 |
| 2013/0314890 A1 * | 11/2013 | Smith | F16M 11/10 | 361/825 |
| 2014/0226298 A1 * | 8/2014 | Palmer | H05K 5/0208 | 361/807 |
| 2016/0348835 A1 * | 12/2016 | Blalock | F16M 13/022 | |
| 2018/0316307 A1 * | 11/2018 | Martin | H02S 40/34 | |

* cited by examiner

SECURING BASE FOR SUPPORTING A DISPLAY SUSPENDING APPARATUS THEREON

CROSS-REFERENCE TO RELATED APPLICATION

This application claims priority of Taiwanese Patent Application No. 107203660, filed on Mar. 21, 2018.

FIELD

The disclosure relates to a securing base, and more particularly to a securing base for supporting a display suspending apparatus thereon.

BACKGROUND

Referring to FIGS. 1 and 2, a conventional display support 1 includes a display suspending apparatus 11 and a securing base 12. The display suspending apparatus 11 is for suspending a display (not shown), and has a bottom portion that is mounted to the securing base 12. The securing base 12 includes a base seat 13, a bolt member 14, and a clamp member 15. The base seat 13 has a securing groove 131 that is adapted for insertion of the display suspending apparatus 11, a receiving groove 132 that receives the clamp member 15, and an internal securing wall 133. The securing groove 131 and the receiving groove 132 are respectively located on opposite sides of the base seat 13. The bolt member 14 has a head portion 141 that is disposed at the securing groove 131 and that abuts against the internal securing wall 133, and an end portion 142 that extends from the head portion 141 through the internal securing wall 133, and that is rotatably secured to the clamp member 15. The clamp member 15 has an engaging segment 151 that is threadedly engaged with the bolt member 14, and a clamp segment 152 that is disposed outside of the base seat 13. The clamp segment 152 and the base seat 13 cooperatively define a clamp opening 16.

Referring to FIGS. 3 and 4, a user may drive the clamp member 15 to move along the bolt member 14 in an up-down direction, by rotating the bolt member 14 with a hex key (not shown). When the clamp member 15 is driven to move upward or downward by the bolt member 14, the size of the clamp opening 16 is adjusted, such that the securing base 12 may be fittingly secured onto an edge of a platform 10. Afterward, as shown in FIG. 4, the user drives the clamp member 15 to move to slightly narrow the clamp opening 16, thereby tightly securing the clamp member 12 onto the platform 10. However, when the clamp member 12 is urged to clamp tightly onto the platform 10, an open end of the clamp segment 152 may warp away from the platform 10, decreasing a contact surface area therebetween, and thereby decreasing the stability of the securing base 12.

SUMMARY

Therefore, an object of the disclosure is to provide a securing base that can alleviate the drawback of the prior art.

According to the disclosure, the securing base includes a base seat unit and a clamp unit.

The base seat unit includes a base seat that is adapted for supporting a display suspending apparatus thereon, has an internal securing wall, and is formed with a receiving groove. The receiving groove has an opening, extends along an axis, and terminates at the internal securing wall.

The clamp unit includes a clamp member and a bolt member. The clamp member has an engaging segment that is disposed within the receiving groove and that is formed with a threaded hole, a clamp segment that is disposed outside of the base seat unit, and a connecting segment that interconnects the engaging segment and the clamp segment, and that cooperates with the engaging segment and the clamp segment to define a clamp space which gradually shrinks in size in a direction away from the connecting segment. The bolt member is rotatably secured to the internal securing wall of the base seat, extends along the axis in the receiving groove, and engages drivingly the threaded hole of the engaging segment of the clamp member. Rotation of the bolt member drives the clamp member to move along the axis

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
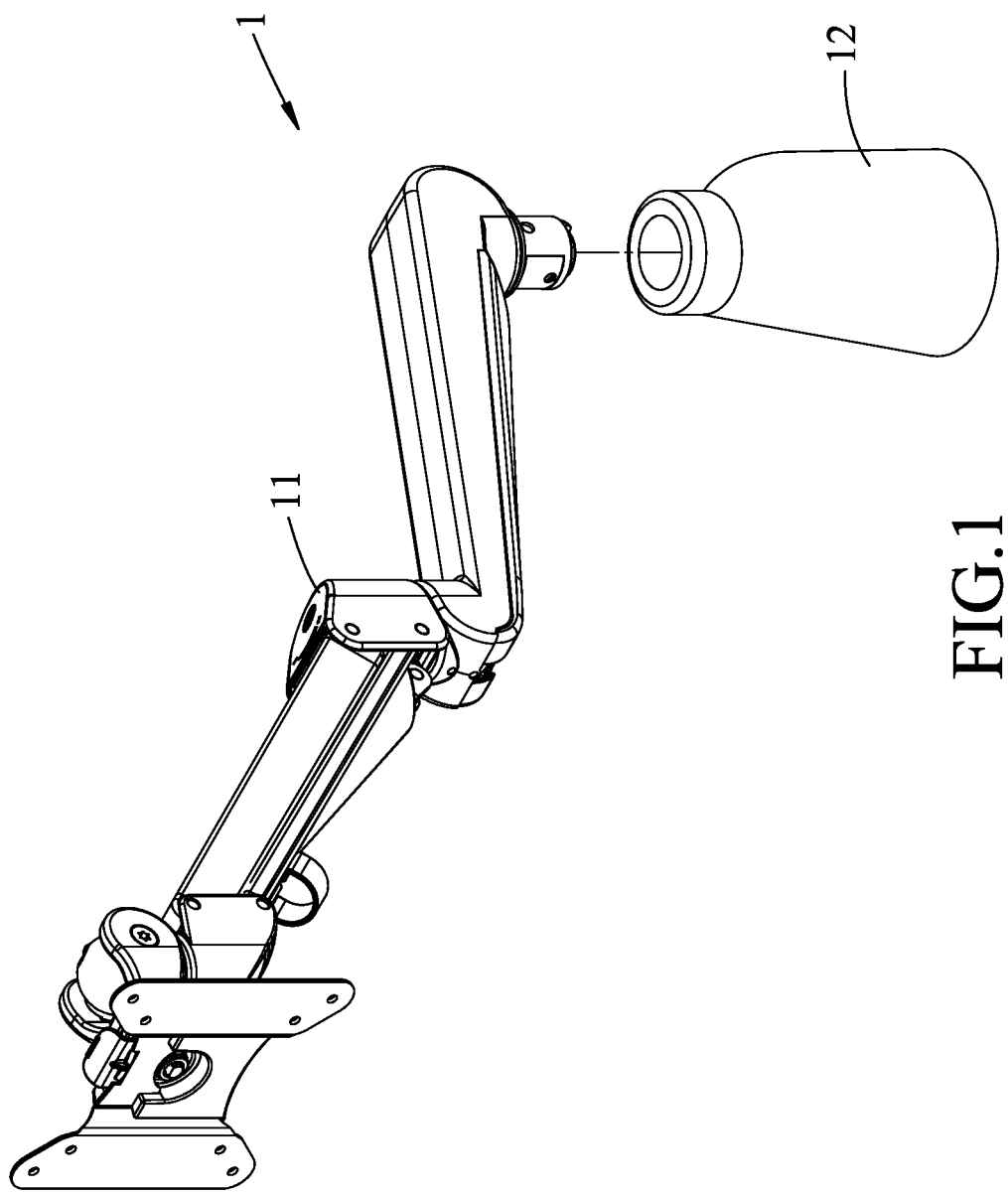
FIG. 1 is a partly exploded perspective view of a conventional display support.
Figure 2:
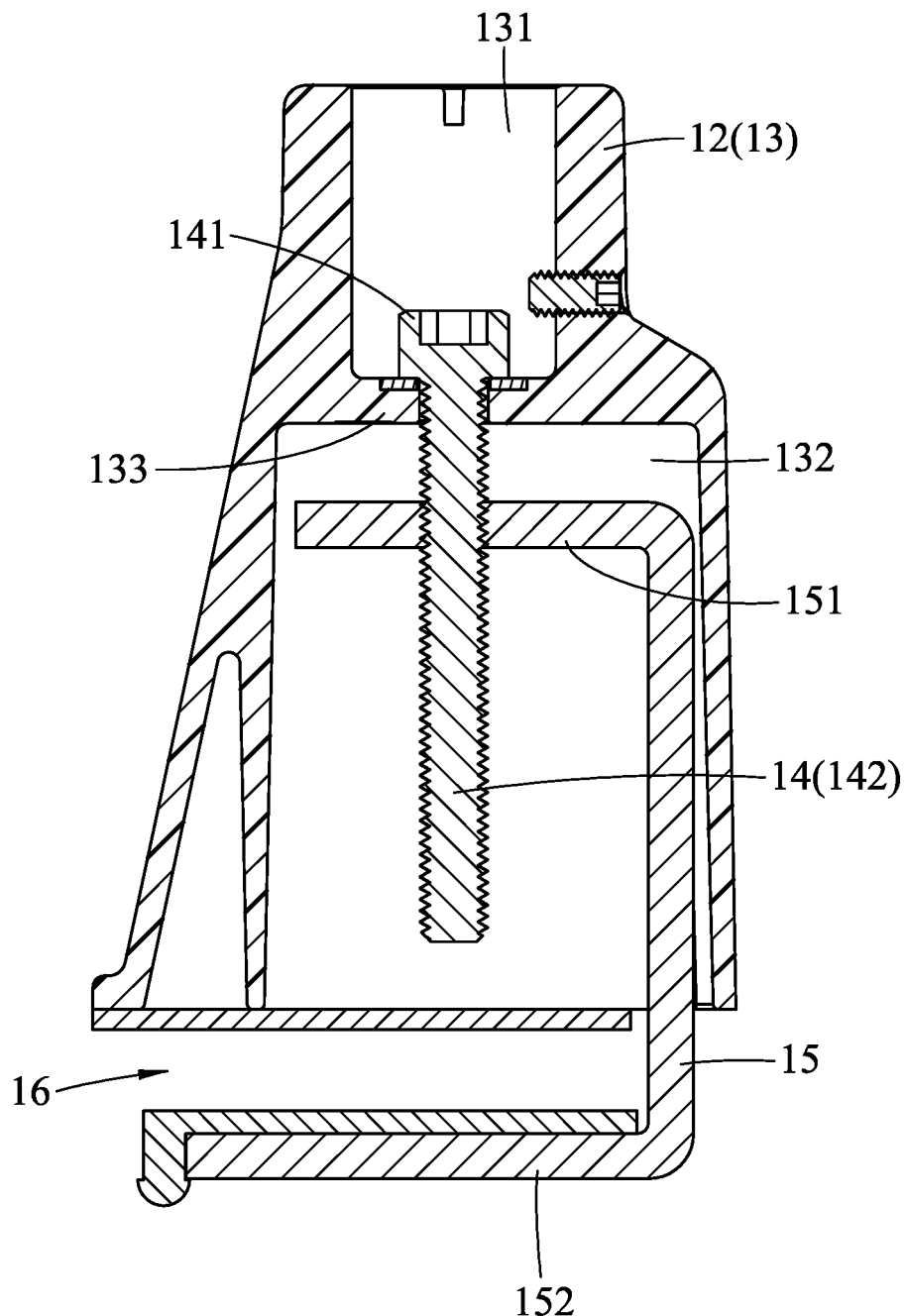
FIG. 2 is a sectional view of a securing base of the conventional display support.
Figure 3:
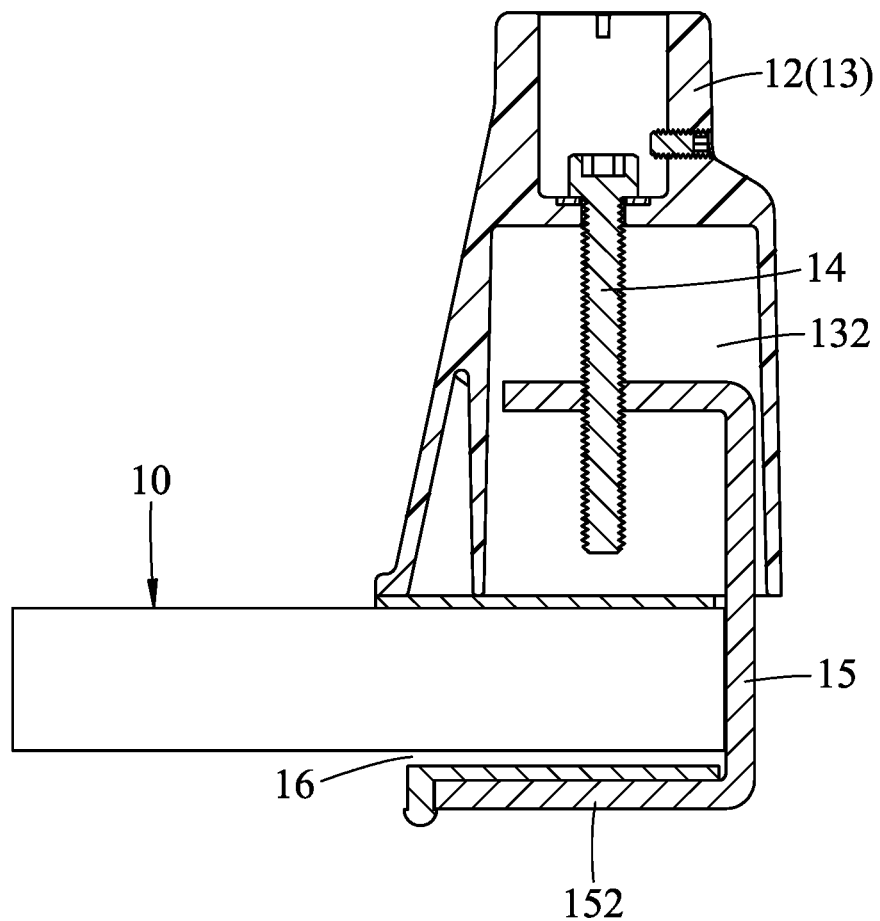
FIG. 3 is a sectional view illustrating the securing base of the conventional display support placed on a platform.
Figure 4:
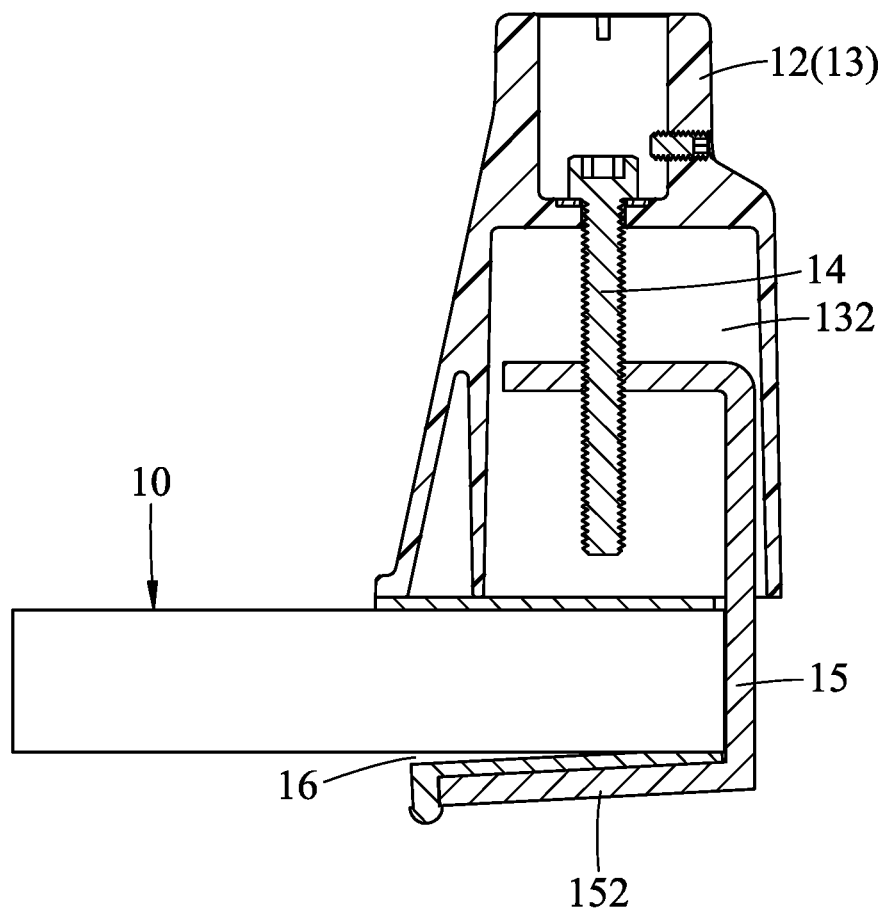
FIG. 4 a sectional view illustrating the securing base of the conventional display support clamping tightly onto the platform.
Figure 5:
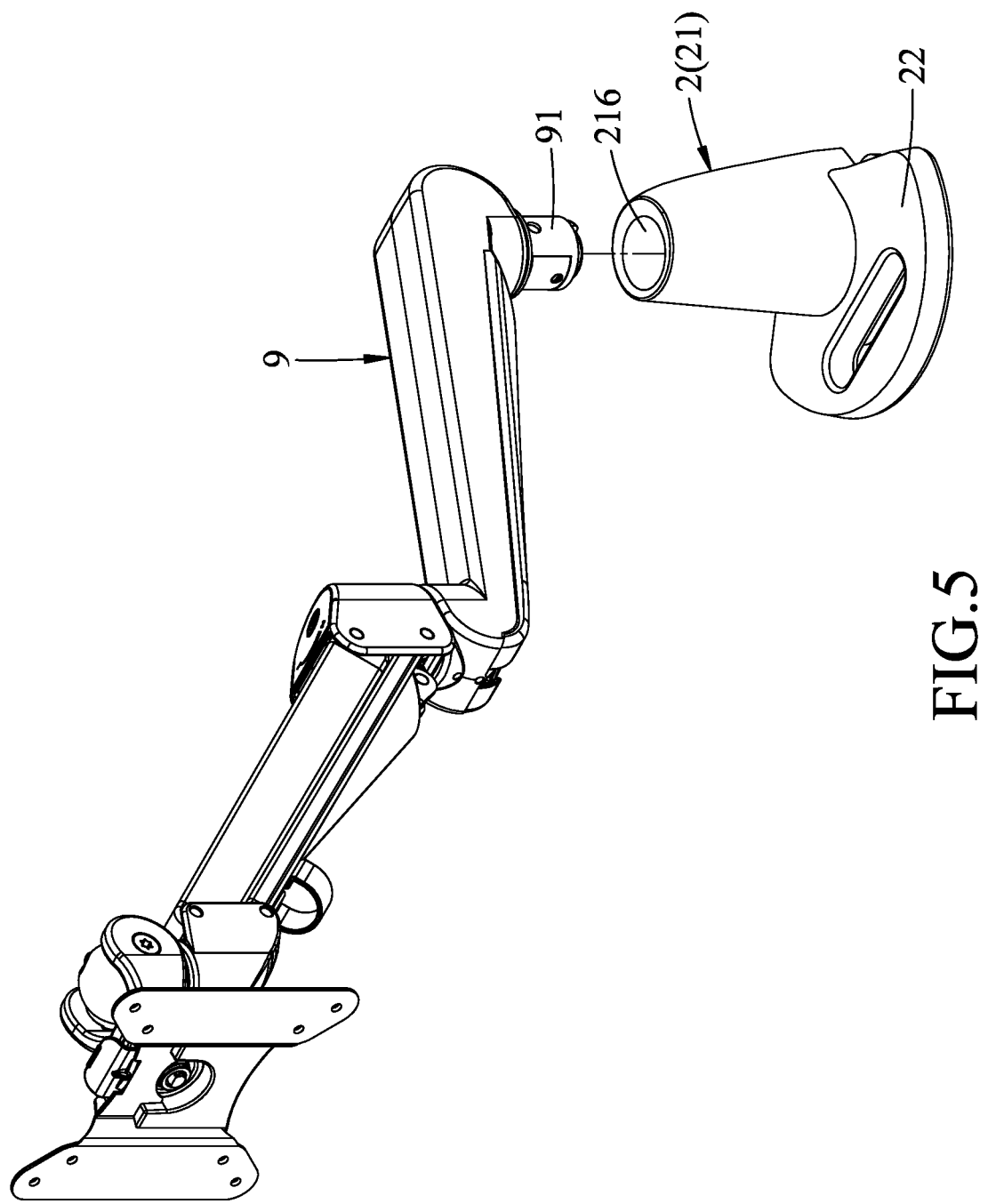
FIG. 5 is a partly exploded perspective view of an embodiment of a securing base according to the disclosure and a display suspending apparatus.
Figure 6:
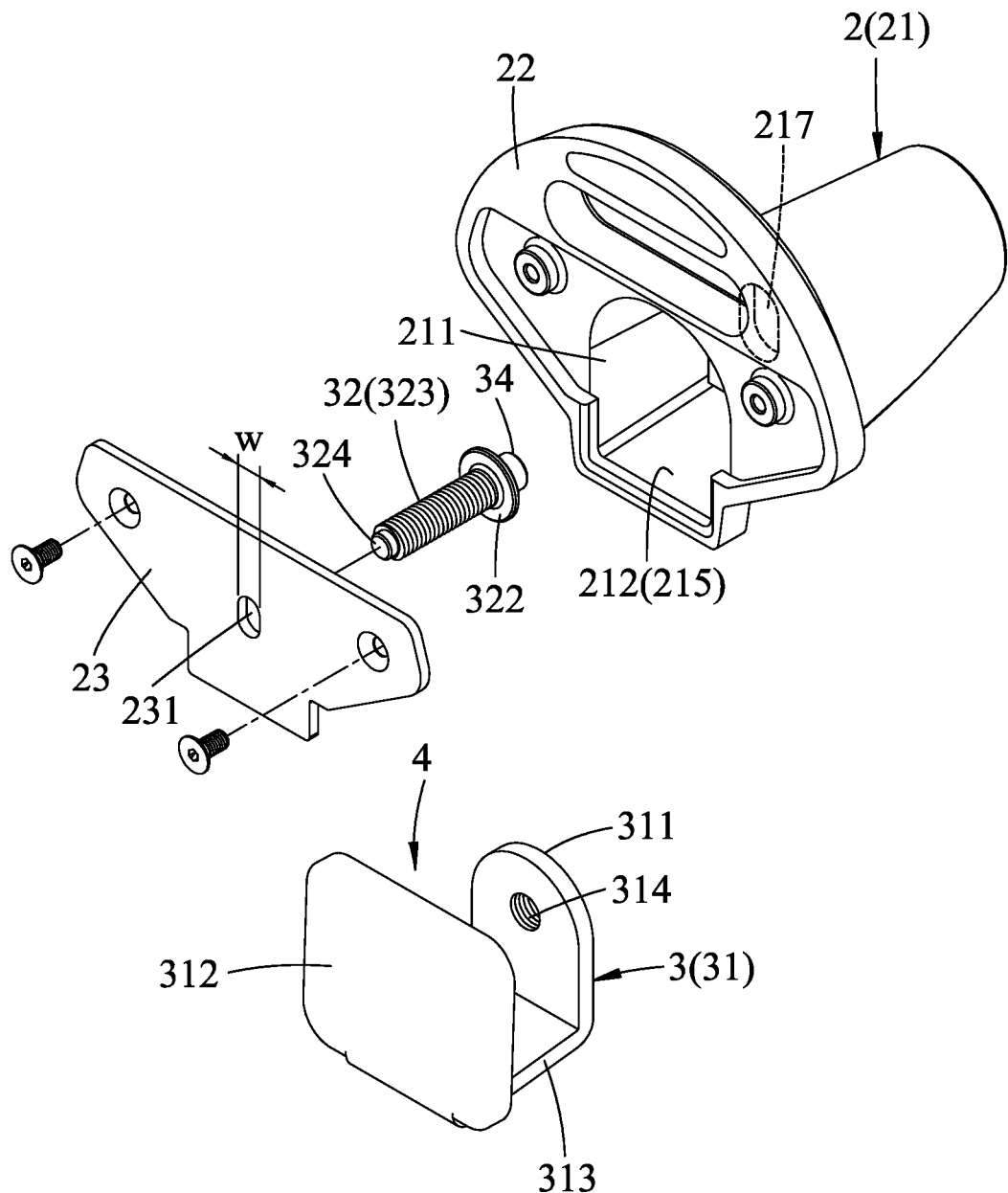
FIG. 6 is an exploded perspective view of the embodiment.
Figure 7:
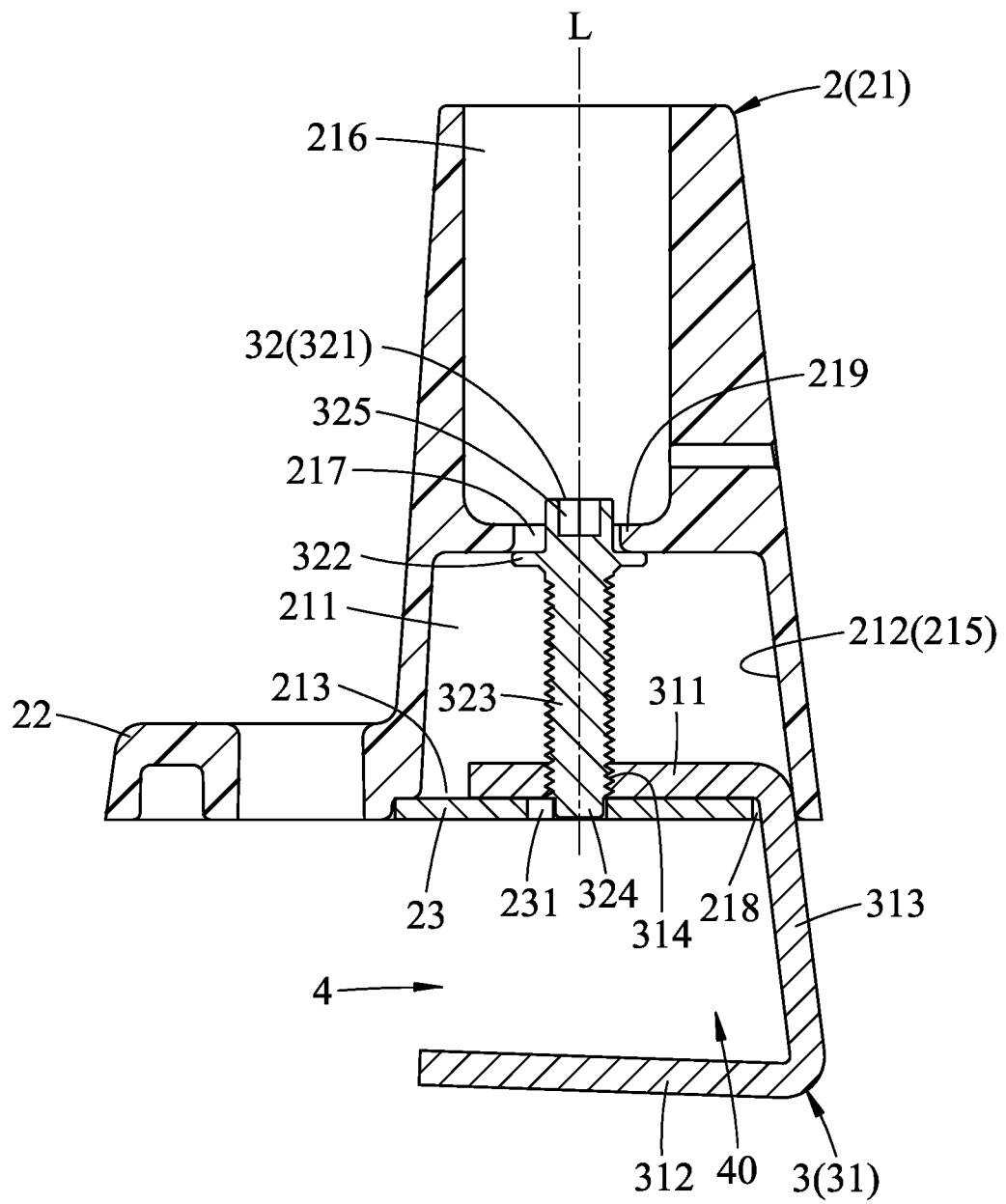
FIG. 7 is a sectional view of the embodiment, illustrating a clamp member at a first position.

Referring to FIGS. 5 to 7, an embodiment of a securing base according to the disclosure is adapted for supporting a display suspending apparatus 9 thereon. The display suspending apparatus 9 has a tip portion that is adapted for holding a display (not shown) and a root portion 91 that is adapted to be coupled with the securing base. The mechanism of the display suspending apparatus 9 is a known art, and will not be explored further in this disclosure.

The securing base includes a base seat unit 2 and a clamp unit 3. The base seat unit 2 is for coupling with the root portion 91 of the display suspending apparatus 9, and the clamp unit 3 may cooperatively clamp onto a platform 8 (see FIGS. 9 and 10) with the base seat unit 2.

The base seat unit 2 includes a base seat 21, an abutment seat 22, and a securing plate 23. The base seat is substantially cylindrical, and has a groove-defining surface 212 that defines a receiving groove 211, and an internal securing wall 219. The receiving groove 211 has an opening 213, extends along an axis (L) and terminates at the internal securing wall 219. The internal securing wall 219 has an end surface that faces the opening 213, that serves as a portion of the groove-defining surface 212, and that is formed with a retaining hole 217. The groove-defining surface 212 has an inclined surface section 215 that is inclined relative to the axis (L). The base seat 21 further has a securing groove 216 that is adapted for insertion of the display suspending apparatus 9. The receiving groove 211 and the securing groove 216 are disposed respectively at opposite sides of the internal securing wall 219. In this embodiment, the retaining hole 217 extends through the internal securing wall 219. The retaining hole 217 is elongated in a direction away from the inclined surface section 215, and is in spatial communication with the receiving groove 211 and the securing groove 216.

The abutment seat 22 is connected to the base seat 21, and is adjacent to the opening 213 of the receiving groove 211. The abutment seat 22 extends radially outward from a bottom end of the base seat 21, and has a shape that is substantially oval. In this embodiment, the abutment seat 22 and the base seat 21 are molded as one piece, but may be formed as separate pieces to be assembled during use in other embodiments.

The securing plate 23 is secured to the abutment seat 22 and is disposed at the opening 213 of the receiving groove 211 of the base seat 21. The securing plate 23 partially covers the opening 213, cooperatively defining a gap 218 with the inclined surface section 215 of the groove-defining surface 212. The securing plate 23 is formed with an insert hole 231 that is aligned with the retaining hole 217 along the axis (L).

The clamp unit 3 includes a clamp member 31 and a bolt member 32. The clamp member 31 is U-shaped, and has an engaging segment 311, a clamp segment 312, and a connecting segment 313. The engaging segment 311 is disposed within the receiving groove 211, and is formed with a threaded hole 314. The clamp segment 312 is disposed outside of the base seat unit 2. The connecting segment 313 passes through the gap 218 of the base seat 21, interconnects the engaging segment 321 and the clamp segment 322, and cooperates with the engaging segment 321 and the clamp segment 322 to define a clamp space 40 which has a clamp opening 4. In this embodiment, the clamp member 31 is made of ferroalloy, but it may be made of plastic or other metal materials in other embodiments.

The clamp space 40 gradually shrinks in size in a direction away from said connecting segment 313. Specifically, the clamp segment 312 and the connecting segment 313 of the clamp member 31 cooperatively define an acute angle therebetween, and the acute angle may range from 76 degrees to 86 degrees. Preferably, the acute angle ranges from 79 degrees to 83 degrees. The connecting segment 313 is in slidable contact with the inclined surface section 215 during the rotation of the bolt member 32. To allow for smooth sliding action of the connecting segment 313 against the inclined surface section 215, the angle between the engaging segment 311 and the connecting segment 313 may be adjusted to match the inclined surface section 215. The engaging segment 311 and the connecting segment 313 of the clamp member 31 cooperatively define an obtuse angle therebetween, and the obtuse angle may range from 92 degrees to 102 degrees. Preferably, the obtuse angle ranges from 95 degrees to 99 degrees. The bolt member 32 has a head portion 321 that rotatably engages the retaining hole 217 of the base seat 21, an end portion 324 that is rotatably retained in the insert hole 231 of the securing plate 23, a flange portion 322 that is connected to the head portion 321, and a threaded portion 323 that interconnects the flange portion 322 and the end portion 324. The head portion 321 protrudes outwardly of the retaining hole 217 and faces the securing groove 216. In this embodiment, the head portion 321 has a polygonal hole 325 that may be engaged with a wrench for rotating the bolt member 32. The flange portion 322 is disposed in the receiving groove 211 and abuts against the internal securing wall 219 of the base seat 21. The threaded portion 323 extends along the axis (L), and engages drivingly the threaded hole 314 of the engaging segment 311 of the clamp member 31. In this embodiment, a maximum diameter of the threaded portion 323 is larger than a width (w) of the insert hole 231, and a diameter of the end portion 324 is smaller than the width of the insert hole 231, such that the insert hole 231 is configured in a manner that the end portion 314 is loosely received in the insert hole 231, and the threaded portion 313 of the bolt member 31 is not allowed to be inserted into the insert hole 231.

Figure 8:
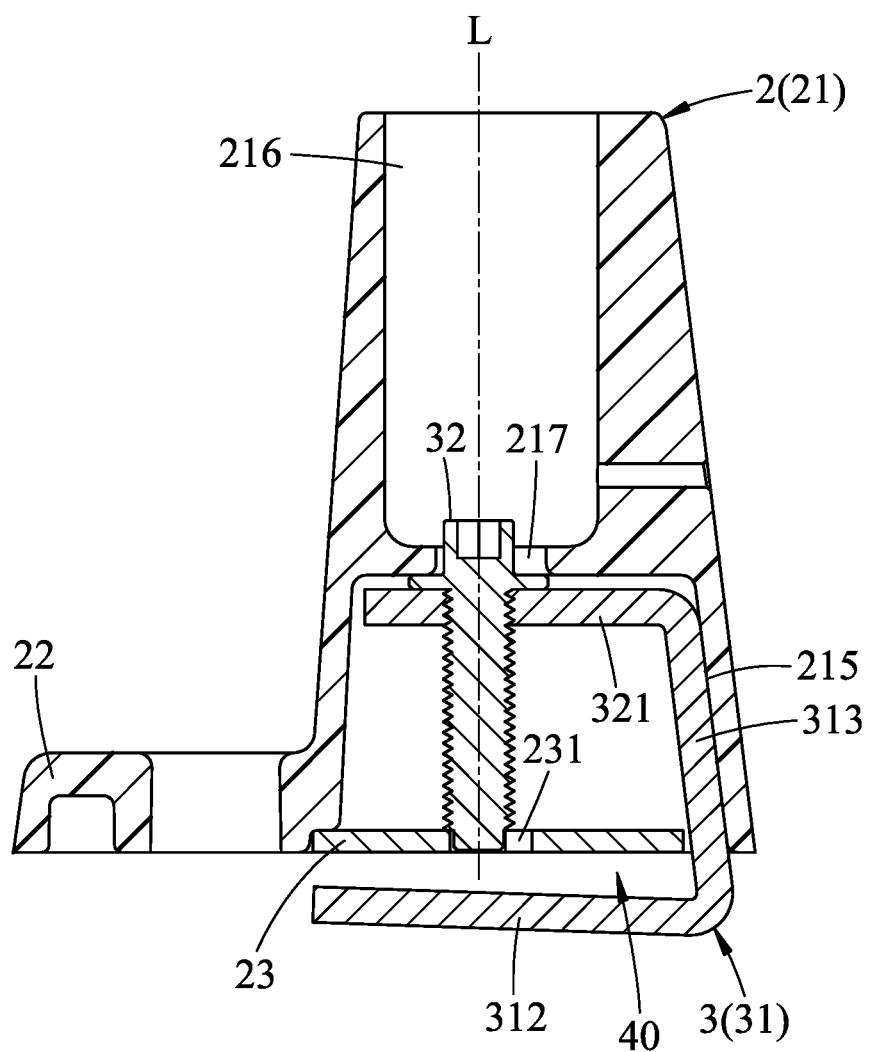
FIG. 8 is another sectional view of the embodiment, illustrating the clamp member at a second position.

Referring to FIGS. 7 and 8, the rotation of the bolt member 32 drives the clamp member 31 to move along the axis (L) between a first position and a second position. When the clamp member 31 is at the first position (shown in FIG. 7), the engaging segment 311 of the clamp member 31 abuts against the securing plate 23 of the base seat unit 2, and the clamp segment 312 of the clamp member 31 is distal from the securing plate 23. When the clamp member 31 is at the second position (shown in FIG. 8), the engaging segment 311 of the clamp member 31 is away from the securing plate 23 of the base seat unit 2, and the clamp segment 312 of the clamp member 31 is proximate to the securing plate 23. It should be noted that, when the bolt member 32 is rotated to drive the clamp member 31 to move from the second position toward the first position, in a case in which the bolt member 32 is kept rotating after the clamp member 31 reaches the first position, the securing plate 23 of the base seat unit 2 prevents the clamp member 31 from falling off through the end portion 324 of the bolt member 32.

Figure 9:
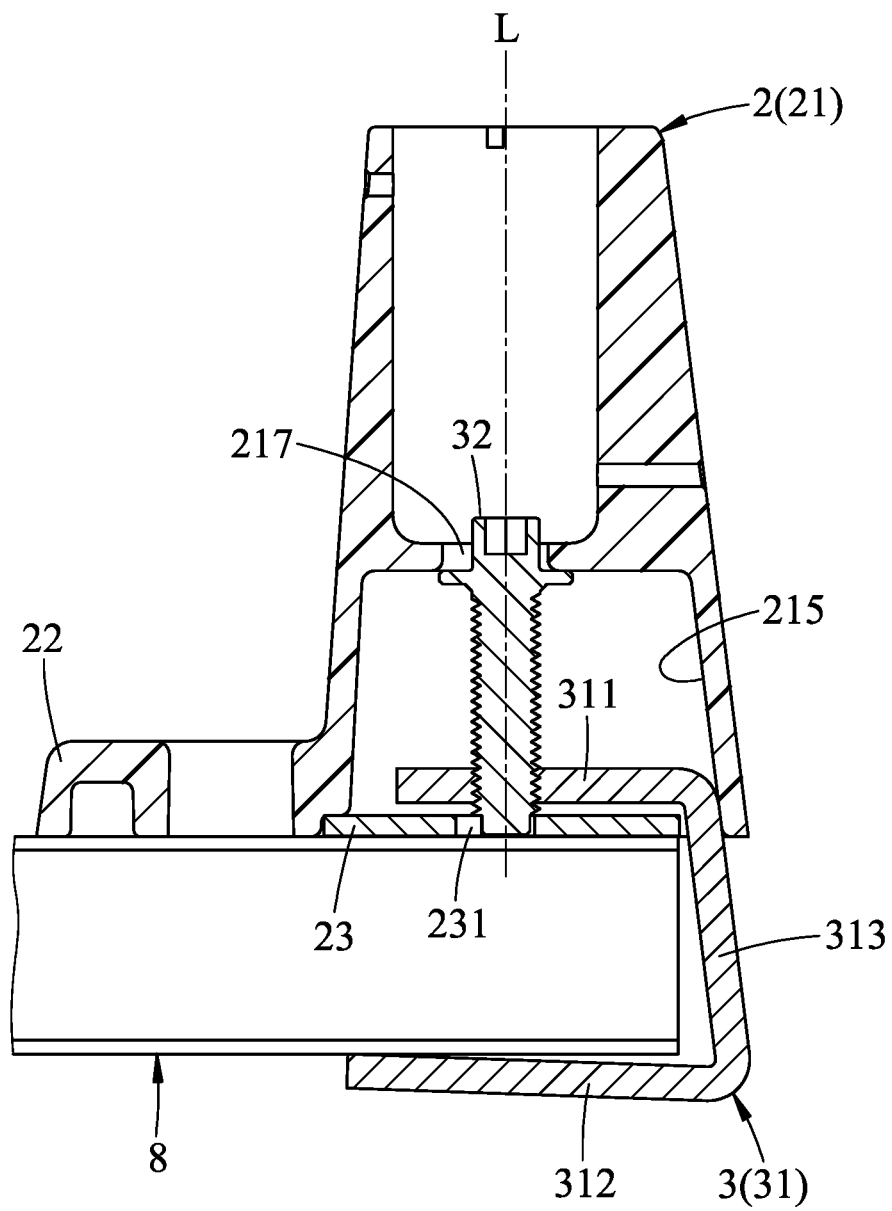
FIG. 9 is a sectional view illustrating the embodiment clamping onto a platform.
Figure 10:
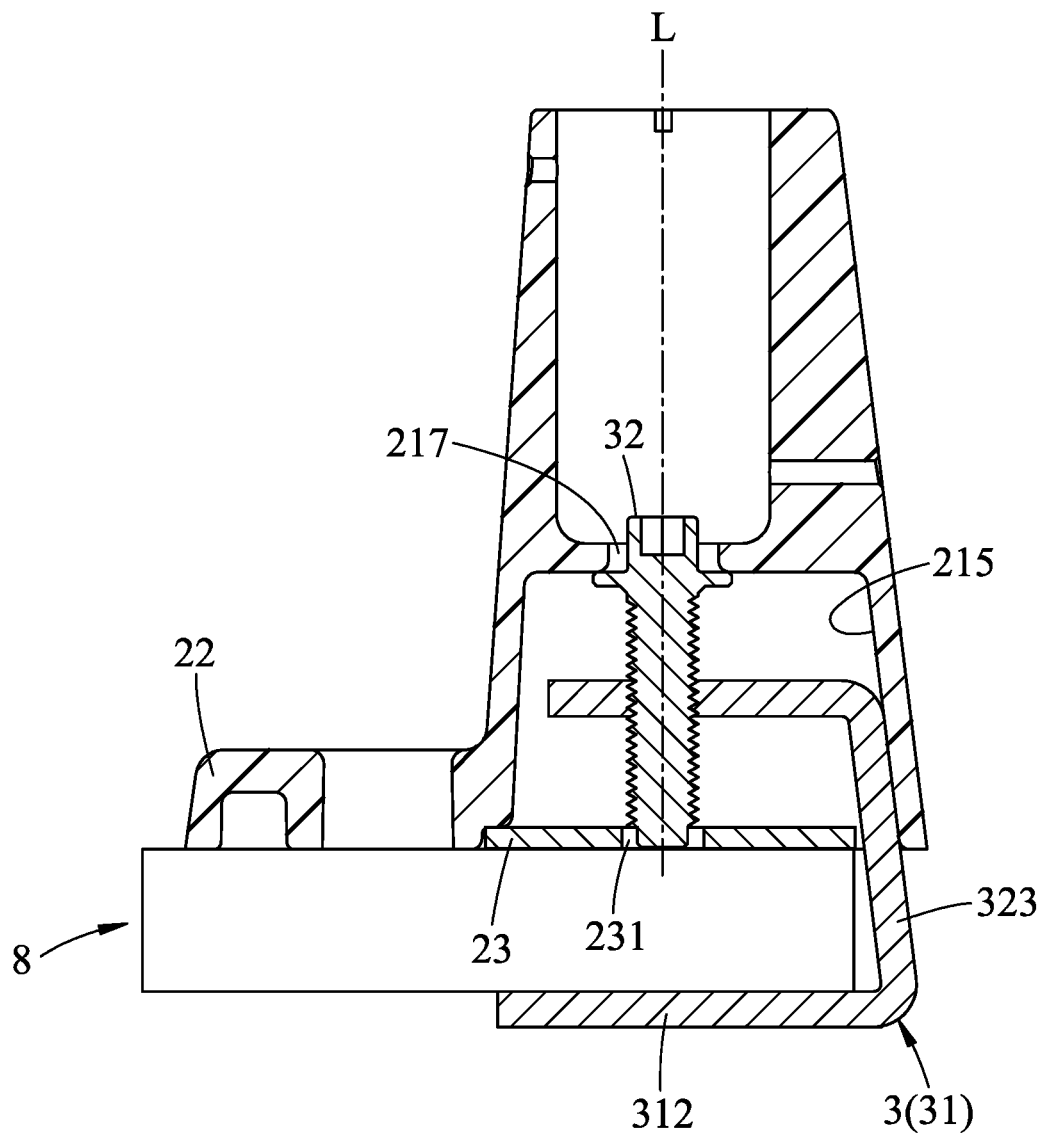
FIG. 10 is a sectional view illustrating that a majority of a clamp segment of the clamp member is in contact with the platform when the clamp segment is brought toward the platform during the movement of the clamp member along a bolt member.

Referring to FIGS. 7 and 9, during its use, the securing base is initially secured onto a platform 8 such as a table top, followed by mounting the display suspending apparatus 9 onto the securing base. Specifically, the user rotates the bolt member 32 to move the clamp member 31 toward the first position until the width of the clamp opening 4 is larger than the width of the platform 8.

When the width of the clamp opening 4 is larger than the width of the platform 8, the securing base can be mounted onto the platform 8 with the clamp space 40 being engaged to an edge of the platform 8. Afterward, the user reversely rotates the bolt member 31 and adjusts the width of the clamp opening 4 accordingly until the clamp member 32 is fittingly clamped to the platform 8. Due to the obtuse angle between the engaging segment 311 and the connecting segment 313 of the clamp member 31, only the open end of the clamp segment 322 abuts against the platform 8 initially. When the clamp member 31 moves further toward the second position, rest of the clamp segment 312 gradually abuts against the platform 8 as well (see FIG. 10), with gripping force of the open end of the clamp segment 312 being amplified to ensure that the clamp member 31 is firmly clamped to the platform 8. During the movement of the clamp member 31 from the first position toward the second position, the connecting segment 313 of the clamp member 31 is guided by the inclined surface section 215 of the groove-defining surface 212 to move the clamp member 31 in the direction away from said inclined surface section 215 toward the securing plate 23, and also moves the bolt member 32 in the direction away from said inclined surface section 215 (with the head portion 321 and the end portion 324 of the bolt member 32 being respectively moved along the retaining hole 217 and the insert hole 231), thereby increasing a contact surface area therebetween for reinforcing the stability of the securing case.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A securing base comprising:
a base seat unit including a base seat that is adapted for supporting a display suspending apparatus thereon, that has an internal securing wall, and that is formed with a receiving groove, said receiving groove having an opening, extending along an axis, and terminating at said internal securing wall; and
a clamp unit including
a clamp member that has
an engaging segment disposed within said receiving groove and formed with a threaded hole,
a clamp segment disposed outside of said base seat unit, and
a connecting segment interconnecting said engaging segment and said clamp segment, and cooperating with said engaging segment and said clamp segment to define a clamp space which gradually shrinks in size in a direction away from said connecting segment, and
a bolt member that is rotatably secured to said internal securing wall of said base seat, that extends along the axis in the receiving groove, and that engages drivingly said threaded hole of said engaging segment of said clamp member;
wherein rotation of said bolt member drives said clamp member to move along the axis;
wherein said base seat further has a groove-defining surface that defines said receiving groove;
wherein said internal securing wall of said base seat has an end surface that faces said opening, that serves as a portion of said groove-defining surface, and that is formed with a retaining hole;
wherein said groove-defining surface has an inclined surface section that is inclined relative to the axis;
wherein said retaining hole is elongated in a direction away from said inclined surface section, said bolt member having a head portion that engages rotatably said retaining hole; and
wherein said connecting segment of the clamp member is in slidable contact with and guided by said inclined surface section to move said bolt member in the direction away from said inclined surface section during the rotation of said bolt member.

2. The securing base as claimed in claim 1, wherein the base seat unit further includes a securing plate that is secured to said base seat and that is disposed at said opening of said receiving groove, said bolt member further having an end portion that is rotatably secured to said securing plate.

3. A securing base comprising:
a base seat unit including a base seat that is adapted for supporting a display suspending apparatus thereon, that has an internal securing wall, and that is formed with a receiving groove, said receiving groove having an opening, extending along an axis, and terminating at said internal securing wall; and
a clamp unit including
a clamp member that has
an engaging segment disposed within said receiving groove and formed with a threaded hole,
a clamp segment disposed outside of said base seat unit, and
a connecting segment interconnecting said engaging segment and said clamp segment, and cooperating with said engaging segment and said clamp segment to define a clamp space which gradually shrinks in size in a direction away from said connecting segment, and
a bolt member that is rotatably secured to said internal securing wall of said base seat, that extends along the axis in the receiving groove, and that engages drivingly said threaded hole of said engaging segment of said clamp member;
wherein rotation of said bolt member drives said clamp member to move along the axis;
wherein said clamp segment and said connecting segment of said clamp member cooperatively define an acute angle therebetween, the acute angle ranging from 76 degrees to 86 degrees;
wherein said engaging segment and said connecting segment of said clamp member cooperatively define an obtuse angle therebetween, the obtuse angle ranging from 92 degrees to 102 degrees;
wherein said base seat further has a groove-defining surface that defines said receiving groove;
wherein said internal securing wall of said base seat has an end surface that faces said opening, that serves as a portion of said groove-defining surface, and that is formed with a retaining hole;
wherein said groove-defining surface has an inclined surface section that is inclined relative to the axis;
wherein said retaining hole is elongated in a direction away from said inclined surface section, said bolt member having a head portion that engages rotatably said retaining hole; and
wherein said connecting segment of the clamp member is in slidable contact with and guided by said inclined surface section to move said bolt member in the direction away from said inclined surface section during the rotation of said bolt member.

4. The securing base as claimed in claim 3, wherein the acute angle ranges from 79 degrees to 83 degrees.

5. The securing base as claimed in claim 3, wherein the obtuse angle ranges from 95 degrees to 99 degrees.

6. The securing base as claimed in claim 3, wherein the base seat unit further includes a securing plate that is secured to said base seat and that is disposed at said opening of said receiving groove, said bolt member further having an end portion that is rotatably secured to said securing plate.

7. A securing base comprising:
- a base seat unit including a base seat that is adapted for supporting a display suspending apparatus thereon, that has an internal securing wall, and that is formed with a receiving groove, said receiving groove having an opening, extending along an axis, and terminating at said internal securing wall; and
- a clamp unit including
    - a clamp member that has
        - an engaging segment disposed within said receiving groove and formed with a threaded hole,
        - a clamp segment disposed outside of said base seat unit, and
        - a connecting segment interconnecting said engaging segment and said clamp segment, and cooperating with said engaging segment and said clamp segment to define a clamp space which gradually shrinks in size in a direction away from said connecting segment, and
    - a bolt member that is rotatably secured to said internal securing wall of said base seat, that extends along the axis in the receiving groove, and that engages drivingly said threaded hole of said engaging segment of said clamp member;

wherein rotation of said bolt member drives said clamp member to move along the axis;

wherein said engaging segment and said connecting segment of said clamp member cooperatively define an obtuse angle therebetween, the obtuse angle ranging from 92 degrees to 102 degrees;

wherein said base seat further has a groove-defining surface that defines said receiving groove;

wherein said internal securing wall of said base seat has an end surface that faces said opening, that serves as a portion of said groove-defining surface, and that is formed with a retaining hole;

wherein said groove-defining surface has an inclined surface section that is inclined relative to the axis;

wherein said retaining hole is elongated in a direction away from said inclined surface section, said bolt member having a head portion that engages rotatably said retaining hole; and wherein said connecting segment of the clamp member is in slidable contact with and guided by said inclined surface section to move said bolt member in the direction away from said inclined surface section during the rotation of said bolt member.

8. The securing base as claimed in claim 7, wherein the obtuse angle ranges from 95 degrees to 99 degrees.

9. The securing base as claimed in claim 7, wherein the base seat unit further includes a securing plate that is secured to said base seat and that is disposed at said opening of said receiving groove, said bolt member further having an end portion that is rotatably secured to said securing plate.

\* \* \* \* \*